L. S. CHADWICK.
CLUTCH MECHANISM FOR AUTOMOBILES AND THE LIKE.
APPLICATION FILED APR. 21, 1908.
899,953.
Patented Sept. 29, 1908.
2 SHEETS—SHEET 1.
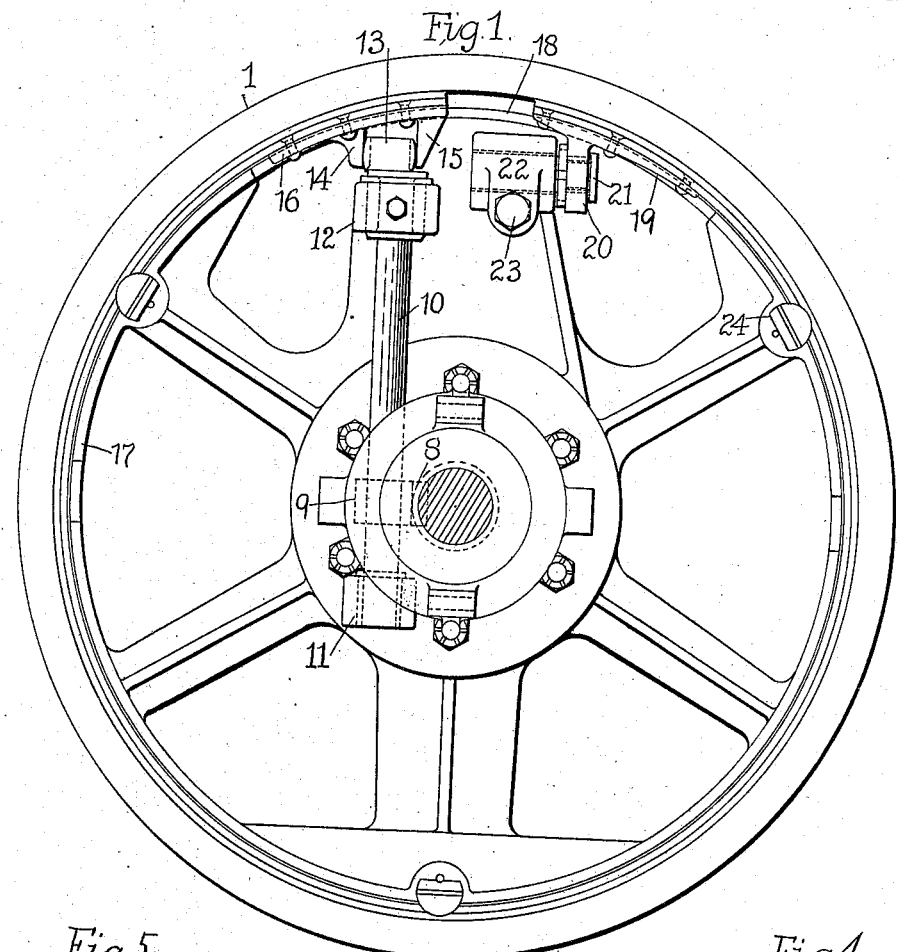
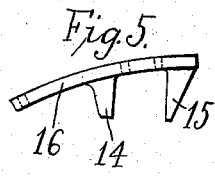
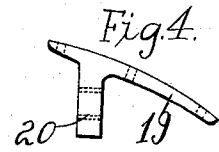
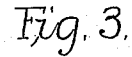
Attest
Bent M. Stahl
Ewd L. Folson
Inventor
Lee S. Chadwick
By Spear, Middleton, Donaldson & Spear
Attys.

L. S. CHADWICK.
CLUTCH MECHANISM FOR AUTOMOBILES AND THE LIKE.
APPLICATION FILED APR. 21, 1908.
899,953.
Patented Sept. 29, 1908.
2 SHEETS—SHEET 2.
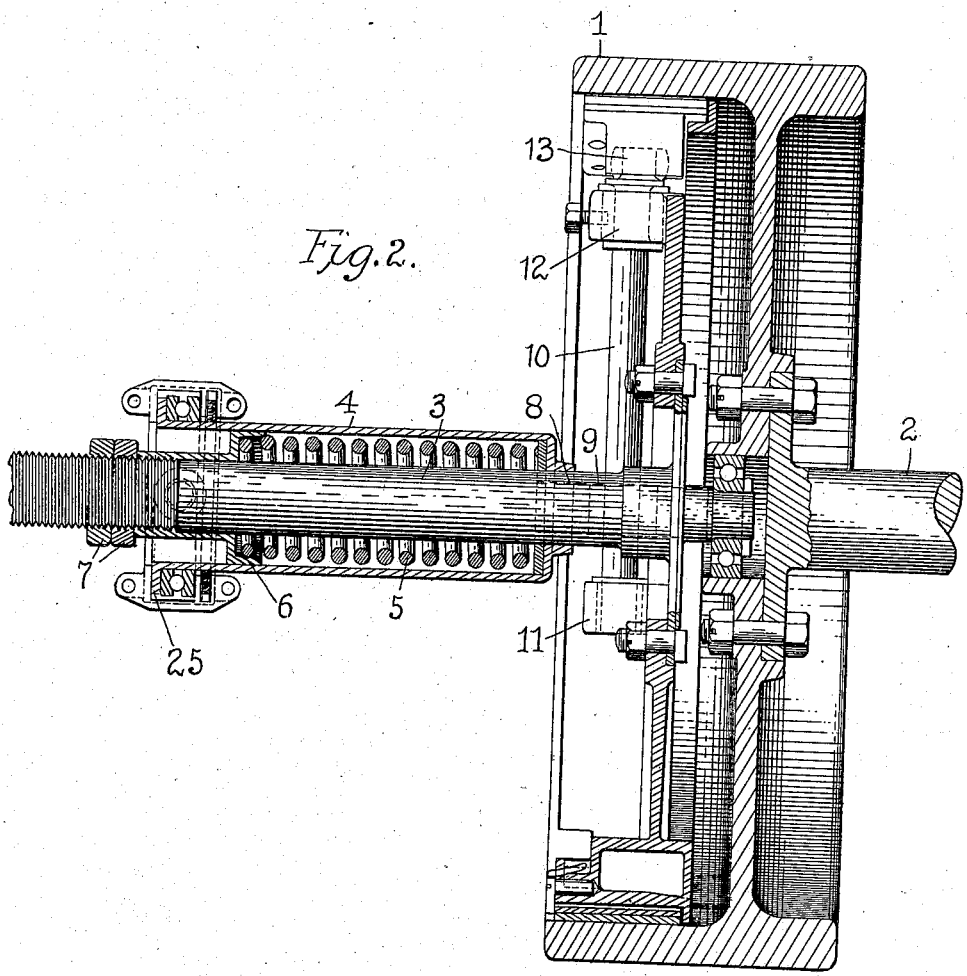

UNITED STATES PATENT OFFICE.

LEE S. CHADWICK, OF PHILADELPHIA, PENNSYLVANIA, ASSIGNOR TO CHADWICK ENGINEERING WORKS, OF PHILADELPHIA, PENNSYLVANIA.

CLUTCH MECHANISM FOR AUTOMOBILES AND THE LIKE.

No. 899,953.          Specification of Letters Patent.          Patented Sept. 29, 1908.

Application filed April 21, 1908. Serial No. 428,352.

*To all whom it may concern:*

Be it known that I, LEE S. CHADWICK, citizen of the United States, residing at Philadelphia, Pennsylvania, have invented certain new and useful Improvements in Clutch Mechanism for Automobiles and the Like, of which the following is a specification.

My invention relates to clutch mechanism for use in automobiles and in like situations.

One object of my invention is to provide a clutch which may be readily adjusted, one which is capable of being readily removed and thoroughly cleaned and replaced without requiring taking down of the entire mechanism relating to this part of the machine. By my invention the tourist can quickly change or renew his clutch means on the road, it being simply necessary for him to carry the extra clutch band.

The invention consists in the features, and combination and arrangement of parts hereinafter described and particularly pointed out in the claims.

In the accompanying drawings, Figure 1 is a front view of the fly wheel of an engine with which my improved clutch is associated, this also being shown in front view. Fig. 2 is a central, vertical sectional view through Fig. 1. Fig. 3 is a detail view relating to one of the clutch band forgings or brackets. Fig. 4 is a detail view of forging looking from the right of Fig. 3. Fig. 5 is a detail view of the forging which is connected with the other end of the clutch band.

In these drawings the fly-wheel of the engine is indicated at 1 on a shaft 2. The clutch shaft 3 is arranged axially in line with the shaft 2 and surrounding this clutch shaft is a clutch sleeve 4 movable longitudinally thereof, being pressed by a spring 5 contained therein, the said spring pressing at one end upon the head of the sleeve and at the other end upon a collar or shoulder 6 which is adjusted by the nuts 7 to increase or decrease the tension of this spring. This sleeve has attached thereto a rack 8 engaging a pinion 9 on a shaft 10 which is journaled in bearings 11, 12, of the clutch body or disk. This rock shaft 10 has a crank member 13 at its end which is located between the projections or lugs 14, 15, of a forging 16 which is riveted or otherwise secured to the clutch band or ring 17. This clutch or friction ring is arranged to have frictional contact with the inner side of the flange of the fly-wheel, it being divided at the point 18. This friction band or clutch ring has at its end opposite to that to which the forging 16 is secured a second forging 19 riveted or otherwise secured thereto, said forging having a lug or hooked shape member 20 extending inwardly therefrom which engages a shouldered stud or bolt 21, the screw threaded end of which is located in a boss or projection 22 on the clutch body or disk wherein it is locked by a cap screw 23. The clutch ring is also held in place by means of screws 24, the heads of which are flattened on one side so that by turning these holding screws half way around the clutch band may be removed by passing it over the flattened surface of the screw heads, the said band being therefore withdrawn in a direction parallel with the axis of the fly-wheel, and from Fig. 3 it will be noticed that this removal of the clutch band is freely permitted by the hooked form of the lug or projection 20 of the forging 19, the opening of which is directed towards the body of the disk or clutch body and so far as the crank 13 is concerned the forging 16 may be disengaged from it with equal facility by simply drawing the clutch band outwardly from the fly-wheel in the direction of the axis thereof, for it will be noticed that this crank portion of the operating shaft 10 simply fits between the lugs of this forging. By this arrangement it will be observed that the whole clutch ring may be readily removed for cleaning or for replacing by a new clutch band by a person of ordinary skill and intelligence and the tourist may readily clean or replace this clutch band at any time while on the road. The clutch band is of light construction and extra bands may be carried without adding appreciably to the weight of the car or encumbering the occupant.

For adjusting the clutch band it is simply necessary to loosen the cap screw 23 and turn the shouldered bolt 21 in or out so that this bolt by acting upon the lug 20 will draw this end of the band towards or remove it further from the opposite end of the band. The clutch band is operated through the shaft 10 and the rack and pinion from the movement of the clutch sleeve. This sleeve may be of substantially known form it being held retracted in the ordinary manner to keep the clutch out of action by pressure of the foot upon a pedal which is connected in any suitable way with the clutch throw-out collar 25.

It will be observed that the clutch ring can be removed for cleaning or replacing by a new clutch ring without necessitating dismantling of any adjacent parts of the mechanism and it is freely accessible under all conditions.

It will be noticed particularly that the clutch band has what may be termed for convenience of description, a removable engagement with its operating and supporting means. I mean by this that no positive connecting means such as bolts, pins or the like are employed to fasten or connect the clutch band to the parts with which it is associated at 13 and 21. In other words, the engagement is rather of an interlocking or slip joint, or coupling nature, the band being at all times ready for disengagement with the operating and supporting means by simply withdrawing or slipping it therefrom after adjusting the screws 24.

It will be clear that the clutch band can be easily removed without changing the adjustment of the clutch, that is to say the clutch band may be removed without altering the adjusting device and when placed back in position again it will be under the same adjustment as it occupied before.

I claim as my invention:

1. A clutch comprising a main clutch member, a split clutch band, means for operating said band, and means independent of the operating means for connecting the end of the band to the main clutch member and for adjusting it circumferentially thereon, said band being removable and replaceable in respect to the main clutch member and the adjusting means, which latter maintains its adjusted position in readiness to receive the band, when replaced, under the same adjustment as before its removal.

2. A clutch comprising a main clutch member, a clutch band, operating means therefor, and adjusting means independent of the operating means to adjust the band circumferentially, said band being removable from said operating means and adjusting means by an axial movement, said adjusting means connecting the end of the clutch band with the main clutch member, substantially as described.

3. In combination, a main clutch member, a split clutch band, operating means, having a slip joint connection with one end of said band, an adjusting screw forming an adjustable connection between the other end of said split band and the main clutch member, and serving to adjust the band circumferentially, and a slip joint connection between said screw and the band whereby said band is freely removable from both its operating and adjusting means and without disturbing the adjustment of the screw, substantially as described.

4. In combination with a main clutch member, a split band, a boss on the main member, a screw or bolt adjustable in the boss, and a hook shaped slip joint connection between the band and said screw bolt to permit the removal of the band, said screw bolt serving to adjust the split band to spread it or contract it circumferentially, substantially as described.

5. In combination with a main clutch member, a split clutch band, an adjustable screw or bolt connecting one end of the band with said main clutch member to adjust the band circumferentially, and a slip joint connection between said band and screw bolt to permit the band to be removed axially of the clutch and be restored without changing the adjustment of said screw bolt, substantially as described.

6. In combination with a main clutch member, a split clutch band, a rock shaft with means thereon for engaging the clutch band, fixed bearings in which said shaft is journaled, said shaft extending from the central part of the clutch outwardly and means for operating the rock shaft, said clutch band having a slip joint connection with the engaging means on the rock shaft whereby the said band may be removed and replaced in an axial direction substantially as described.

7. In combination with a main clutch member, a split clutch band having inwardly extending projections, a rock shaft having means thereon engaging between said projections to operate the said band, bearings in which said shaft is journaled, said shaft extending from the central part of the clutch outwardly and means for operating the rock shaft, said projections permitting the clutch band to be slipped out of and into connection with the operating means on the rock shaft substantially as described.

8. In combination in a clutch a main clutch member, a split clutch band, operating means having a slip joint connection with one end of the band, and an adjustable member having a slip joint connection with the other end of the band and adapted to adjust the same circumferentially, said band being removable and replaceable without disturbing the adjustment, substantially as described.

In testimony whereof, I affix my signature in presence of two witnesses.

LEE S. CHADWICK.

Witnesses:
J. H. MAXWELL,
HENRY H. BLIEM.